United States Patent
Fu

(10) Patent No.: US 11,209,665 B2
(45) Date of Patent: Dec. 28, 2021

(54) APPLICATION INTERFACE DISPLAY METHOD AND APPARATUS, AND STORAGE MEDIUM

(71) Applicant: BEIJING XIAOMI MOBILE SOFTWARE CO., LTD., Beijing (CN)

(72) Inventor: Chuanhai Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/871,834

(22) Filed: May 11, 2020

(65) Prior Publication Data

US 2021/0208419 A1 Jul. 8, 2021

(30) Foreign Application Priority Data

Jan. 6, 2020 (CN) .......................... 202010011042.0

(51) Int. Cl.
| | |
|---|---|
| G06F 3/048 | (2013.01) |
| G02B 30/40 | (2020.01) |
| H04M 1/72442 | (2021.01) |
| H04M 1/72454 | (2021.01) |
| G06F 3/0484 | (2013.01) |

(52) U.S. Cl.
CPC .......... *G02B 30/40* (2020.01); *G06F 3/04845* (2013.01); *H04M 1/72442* (2021.01); *H04M 1/72454* (2021.01)

(58) Field of Classification Search
CPC ............................. G06F 3/04845; G02B 30/40
See application file for complete search history.

(56) References Cited

U.S. PATENT DOCUMENTS

| | | | |
|---|---|---|---|
| 2009/0061837 | A1 | 3/2009 | Chaudhri et al. |
| 2012/0050259 | A1* | 3/2012 | Solomonov .......... G06T 15/005 345/419 |
| 2012/0108328 | A1* | 5/2012 | Konno ................ H04N 13/398 463/31 |
| 2012/0242807 | A1* | 9/2012 | Umezu ................ H04N 13/239 348/47 |

(Continued)

FOREIGN PATENT DOCUMENTS

| | | |
|---|---|---|
| CN | 102377875 A | 3/2012 |
| CN | 102461181 A | 5/2012 |

(Continued)

OTHER PUBLICATIONS

Extended European Search Report dated Nov. 12, 2020 in the European application No. 20175605.3, 7 pages.

(Continued)

*Primary Examiner* — David E Choi
(74) *Attorney, Agent, or Firm* — Oblon, McClelland, Maier & Neustadt, L.L.P.

(57) ABSTRACT

Aspect of the disclosure provide an application interface display method and apparatus, and a storage medium. The method can include launching an application to enter an application interface, determining to output multimedia information on the application interface, and switching a display effect of a preset region of the application interface from a two-dimensional display effect to a three-dimensional display effect when the multimedia information is output.

18 Claims, 8 Drawing Sheets

(56) References Cited

U.S. PATENT DOCUMENTS

| | | | | |
|---|---|---|---|---|
| 2012/0313946 | A1* | 12/2012 | Nakamura | G06F 3/04817 |
| | | | | 345/426 |
| 2012/0329527 | A1* | 12/2012 | Kang | H04N 13/349 |
| | | | | 455/566 |
| 2013/0127989 | A1 | 5/2013 | Chen et al. | |
| 2013/0285964 | A1* | 10/2013 | Kang | G06F 3/0481 |
| | | | | 345/173 |
| 2017/0052759 | A1 | 2/2017 | Chaudhri et al. | |
| 2019/0197672 | A1* | 6/2019 | Lee | G06T 5/008 |
| 2019/0243469 | A1* | 8/2019 | Kuribayashi | G06F 3/0418 |
| 2020/0019372 | A1 | 1/2020 | Chaudhri et al. | |

FOREIGN PATENT DOCUMENTS

| | | |
|---|---|---|
| CN | 102736827 A | 10/2012 |
| CN | 102970498 A | 3/2013 |
| CN | 104469338 A | 8/2016 |
| CN | 109542321 A | 3/2019 |
| KR | 10-2012-0130394 A | 12/2012 |
| WO | WO 2009/032800 A2 | 3/2009 |

OTHER PUBLICATIONS

Combined Chinese Office Action and Search Report dated Jun. 3, 2021 in corresponding Chinese Patent Application No. 202010011042.0 (with English Translation), 18 pages.

* cited by examiner

APPLICATION INTERFACE DISPLAY METHOD AND APPARATUS, AND STORAGE MEDIUM

CROSS-REFERENCE TO RELATED APPLICATION

This application claims priority to Chinese patent application No. 202010011042.0 filed on Jan. 6, 2020, the disclosure of which is hereby incorporated by reference in its entirety.

TECHNICAL FIELD

The disclosure generally relates to the field of computer communications, and more particularly, to an application interface display method and apparatus, and a storage medium.

BACKGROUND

With the continuous development of electronic technologies, electronic products have more and more functions. When an Application (APP) is installed on an electronic device, the application interface of the APP can be displayed on a display screen of the electronic device. However, at present, the application interface is mainly displayed in a static displaying manner.

By taking as an example a situation where the electronic product is a mobile phone and the APP is a music player installed on the mobile phone, when pieces of music are played in the mobile phone, certain interfaces of the music player can be displayed on the display screen of the mobile phone. Since each piece of music has a corresponding play duration, if a static interface is displayed on the display screen of the mobile phone all the time within the play duration, the listening experience of a user will be reduced.

SUMMARY

The disclosure provides an application interface display method and apparatus, and a storage medium.

According to a first aspect of the disclosure, an application interface display method can include launching an application to enter an application interface, determining to output multimedia information on the application interface, and, when the multimedia information is output, switching a display effect of a preset region of the application interface from a two-dimensional display effect to a three-dimensional display effect.

According to a second aspect of the disclosure, an application interface display apparatus can include a processor and a memory that is configured to store instructions executable by the processor. The processor may be configured to launch an application to enter an application interface, determine to output multimedia information on the application interface, and, when the multimedia information is output, switch a display effect of a preset region of the application interface from a two-dimensional display effect to a three-dimensional display effect.

A third aspect of the disclosure can include a non-transitory computer-readable storage medium that has stored thereon instructions that, when executed by a processor of an application interface display apparatus, may cause the processor to execute the operations of the application interface display method. The method can include launching an application to enter an application interface, determining to output multimedia information on the application interface, and, when the multimedia information is output, switching a display effect of a preset region of the application interface from a two-dimensional display effect to a three-dimensional display effect.

It is to be understood that the above general description and the following detailed description are exemplary and explanatory only, and are not intended to limit the disclosure.

BRIEF DESCRIPTION OF THE DRAWINGS

The drawings herein, which are incorporated in and constitute a part of the specification, illustrate embodiments consistent with the disclosure, and explain the principles of the disclosure together with the specification.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as detailed in the appended claims.

Figure 1:
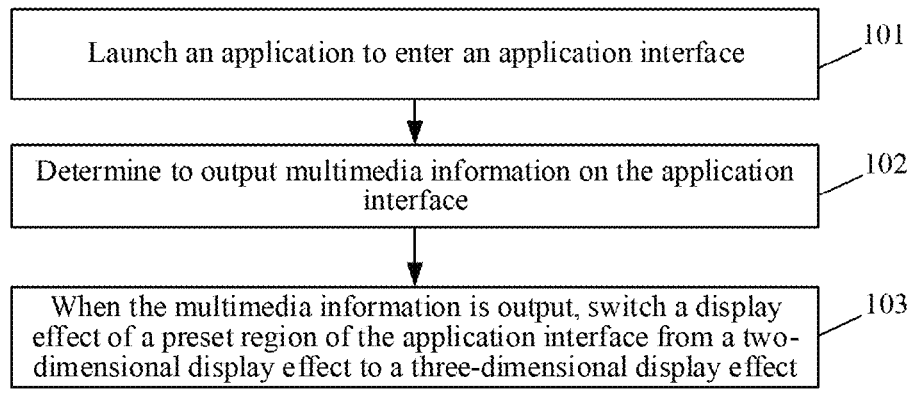
FIG. 1 is a first flowchart of an application interface display method according to exemplary embodiments of the disclosure.

FIG. 1 is a first flowchart of an application interface display method according to some embodiments of the disclosure. As shown in FIG. 1, the method includes operation steps 101 to 103.

At step 101, an application is launched to enter an application interface.

At step 102, it is determined to output multimedia information on the application interface.

At step 103, when the multimedia information is output, a display effect of a preset region of the application interface is switched from a two-dimensional display effect to a three-dimensional display effect. The application interface display method may be applied to a mobile terminal and a fixed terminal. The mobile terminal can include a mobile phone, a tablet computer, a notebook computer, and the like. The fixed terminal can include a personal computer.

By taking application of the application interface display method to the mobile terminal as an example, the application installed on the mobile terminal may be launched based on an input operation received by the mobile terminal. For example, when a click operation for shortcut of the application is received, the application is launched to enter the application interface of the application. The application may include a music player, a video player, a voice assistant, and the like. The application interface may be any interface after the application is launched to enter the application.

After the application is launched, the multimedia information may be output on the application interface. When the multimedia information is output, the display effect of the preset region of the application interface is switched from the two-dimensional display effect to the three-dimensional display effect. The preset region may be a region displaying a predetermined image on the application interface, or may be a region displaying no predetermined image on the application interface. When the predetermined region is the region displaying the predetermined image, the predetermined image may be transformed, or line frames are added around the predetermined image, so as to obtain an image having the three-dimensional display effect according to the predetermined image having the two-dimensional display effect. The transformation processing includes performing perspective transformation on the predetermined image, or performing projection transformation on the predetermined image, and the like.

In the embodiments of the disclosure, when the multimedia information is output, the display effect of the preset region of the application interface of the application can be switched from the two-dimensional display effect to the three-dimensional display effect. Compared with the displaying of a single static image on the application interface only, the disclosure can switch an image from the two-dimensional display effect to the three-dimensional display effect, so that a planar image of the preset region exhibits a stereoscopic effect to improve the user experience.

Figure 2:
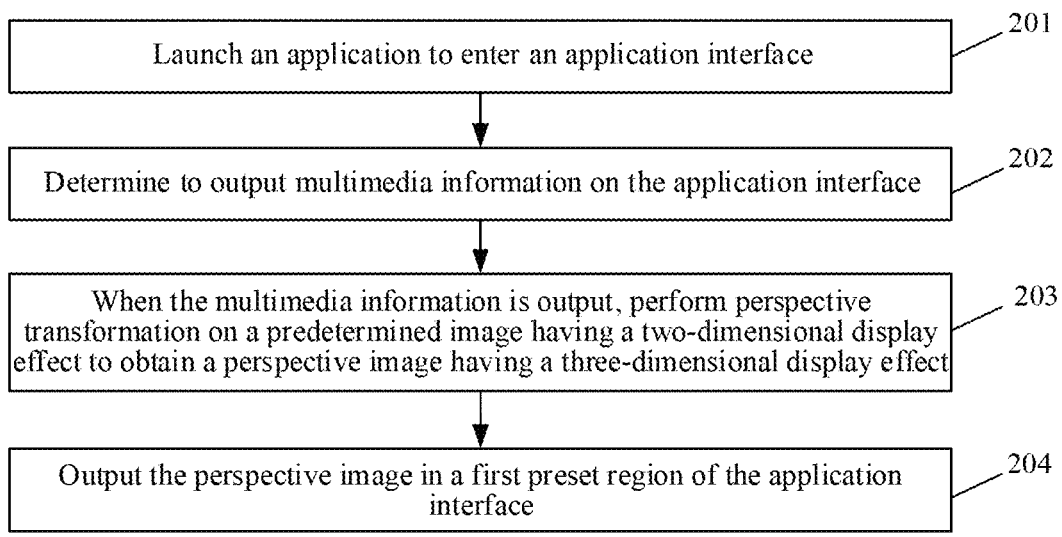
FIG. 2 is a second flowchart of an application interface display method according to exemplary embodiments of the disclosure.

FIG. 2 is a first flowchart of an application interface display method according to some embodiments of the disclosure. As shown in FIG. 2, the method includes operation steps 201 to 204.

At step 201, an application is launched to enter an application interface.

At step 202, it is determined to output multimedia information on the application interface.

At step 203, when the multimedia information is output, perspective transformation is performed on a predetermined image having a two-dimensional display effect to obtain a perspective image having a three-dimensional display effect.

At step 204, the perspective image is output in a first preset region of the application interface.

In the embodiments of the disclosure, by taking a music player serving as the application as an example, the output multimedia information may be music. When the music player outputs a piece of music, the predetermined image matched with the current output music may be displayed on the application interface in the two-dimensional display effect, and is subjected to the perspective transformation to obtain the perspective image having the three-dimensional display effect. Compared with the situation that the predetermined image is displayed all the time in the two-dimensional display effect in the music playing process, the embodiments of the disclosure enable the finally displayed image to exhibit a stronger stereoscopic effect by transforming the predetermined image having the two-dimensional display effect into the perspective image having the three-dimensional display effect, so as to improve the user experience.

By taking a video player serving as the application as an example, the output multimedia information may be a video. When the video player outputs the video, a current image (the predetermined image) may be displayed on the application interface in the two-dimensional display effect, and is subjected to the perspective transformation to obtain the perspective image having the three-dimensional display effect. Compared with the situation that the current image is displayed all the time in the two-dimensional display effect in the video playing process, the embodiments of the disclosure enable the displayed image to exhibit a stronger stereoscopic effect by transforming the image having the two-dimensional display effect into the perspective image having the three-dimensional display effect, so as to improve the user experience.

In an alternative embodiment, the step that the perspective transformation is performed on the predetermined image having the two-dimensional display effect to obtain the perspective image having the three-dimensional display effect includes one of the following operations.

At least two outward-expanding line frames with different sizes are set around the predetermined image to obtain the perspective image having the three-dimensional display effect. Or, at least two inward-shrinking line frames with different sizes are set within the predetermined image to obtain the perspective image having the three-dimensional display effect.

Figure 3:
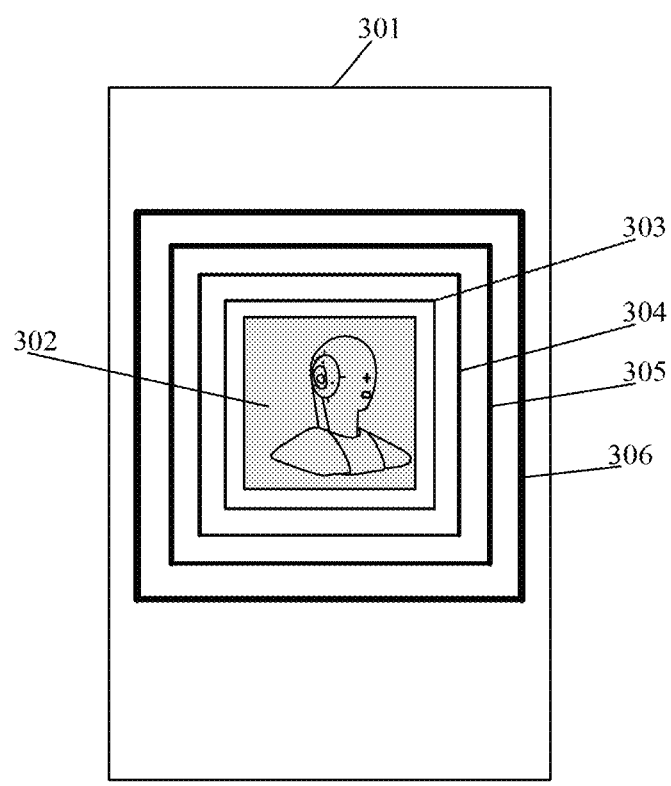
FIG. 3 is a first schematic diagram of a three-dimensional display effect according to exemplary embodiments of the disclosure.

FIG. 3 is a first schematic diagram of a three-dimensional display effect according to some embodiments of the disclosure. As shown in FIG. 3, a predetermined image 302 is displayed on an application interface 301, and a first outward-expanding line frame 303, a second outward-expanding line frame 304, a third outward-expanding line frame 305 and a fourth outward-expanding line frame 306 are disposed around the predetermined image 302. The sizes of the first outward-expanding line frame 303, the second outward-expanding line frame 304, the third outward-expanding line frame 305 and the fourth outward-expanding line frame 306 are different. In this way, the predetermined image 302 and the outward-expanding line frames disposed around the predetermined image may jointly form a perspective image having the three-dimensional display effect.

Figure 4:
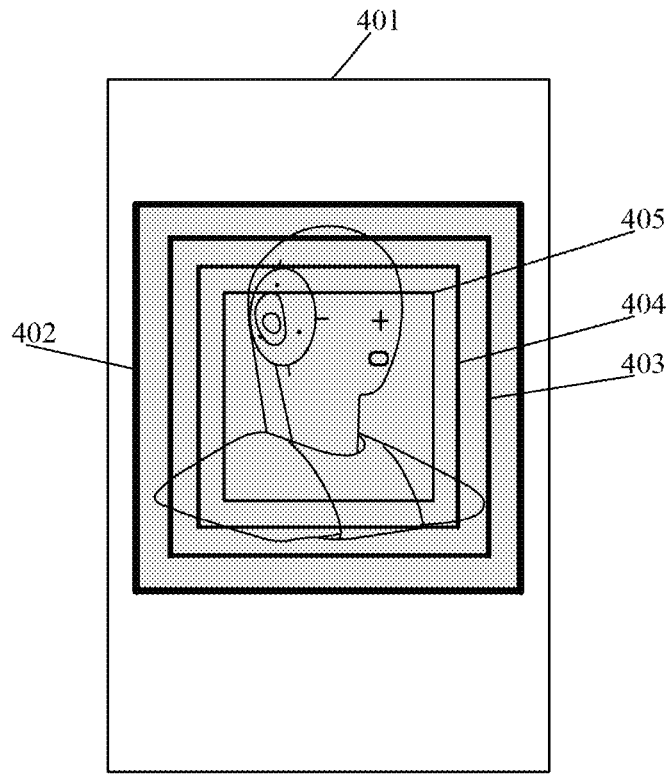
FIG. 4 is a second schematic diagram of a three-dimensional display effect according to exemplary embodiments of the disclosure.

FIG. 4 is a second schematic diagram of a three-dimensional display effect according to some embodiments of the disclosure. As shown in FIG. 4, a predetermined image 402 is displayed on an application interface 401, and a first inward-shrinking line frame 403, a second inward-shrinking line frame 404, and a third inward-shrinking line frame 405 are disposed around the predetermined image 402. The sizes of the first inward-shrinking line frame 403, the second inward-shrinking line frame 404 and the fourth inward-shrinking line frame 405 are different. In this way, the predetermined image 402 and the inward-shrinking line frames disposed within the predetermined image may jointly form a perspective image having the three-dimensional display effect.

In an alternative embodiment, the predetermined image may also be switched from the two-dimensional display effect to the three-dimensional display effect by setting color parameters of the outward-expanding line frames and the inward-shrinking line frames. For example, the outward-expanding line frames and the inward-shrinking line frames are set to be gradually changing colors, so as to improve the stereoscopic effect of the formed perspective image. In an alternative embodiment, the color parameters of the outward-expanding line frames and the inward-shrinking line frames may also be determined according to color parameters of the predetermined image. In this way, on one hand, the color of the predetermined image is in better line with the colors of the outward-expanding line frames and the inward-shrinking line frames, and on the other hand, different three-dimensional display effects may be set according to different predetermined images. By taking a music player serving as the application as an example, the color parameters of the line frames surrounding the image are determined according to the color parameters of the image matched with a piece of music being played by the music player, so that different three-dimensional display effects may be achieved for different pieces of music to improve the user experience.

Figure 5:
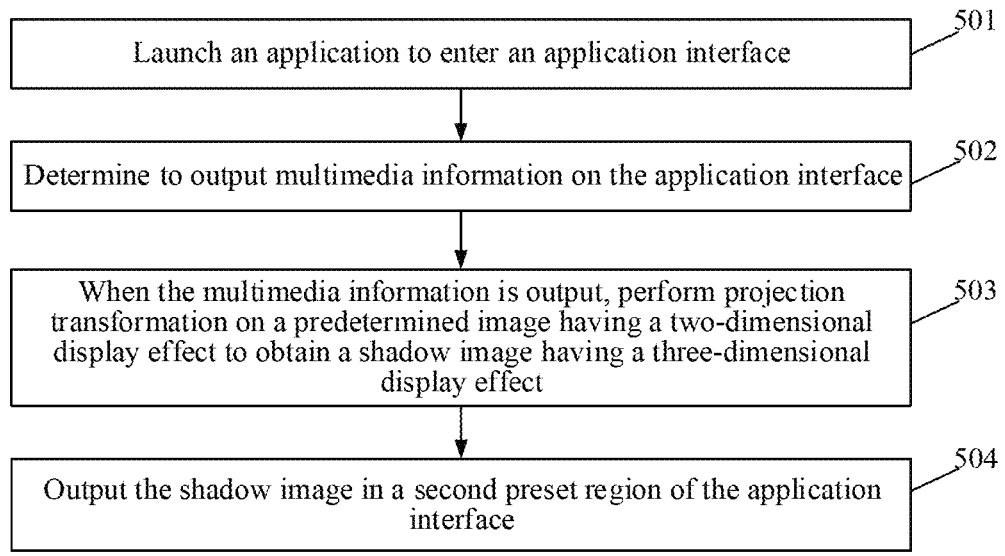
FIG. 5 is a third flowchart of an application interface display method according to exemplary embodiments of the disclosure.

FIG. 5 is a third flowchart of an application interface display method according to some embodiments of the disclosure. As shown in FIG. 5, the method includes operation steps 501 to 504.

At step 501, an application is launched to enter an application interface.

At step 502, it is determined to output multimedia information on the application interface.

At step 503, when the multimedia information is output, projection transformation is performed on a predetermined image having a two-dimensional display effect to obtain a shadow image having a three-dimensional display effect.

At step 504, the shadow image in a second preset region of the application interface.

In the embodiments of the disclosure, by taking a music player serving as the application as an example, the output multimedia information may be music. When the music player outputs a piece of music, the predetermined image matched with the current output music may be displayed on the application interface in the two-dimensional display effect, and is subjected to the shadow transformation to obtain the shadow image having the three-dimensional display effect. Compared with the situation that the predetermined image is displayed all the time in the two-dimensional display effect in the music playing process, the embodiments of the disclosure enable the finally displayed image to exhibit a stronger stereoscopic effect by transforming the predetermined image having the two-dimensional display effect into the shadow image having the three-dimensional display effect, so as to improve the user experience.

In an alternative embodiment, the step that the projection transformation is performed on the predetermined image having the two-dimensional display effect to obtain the shadow image having the three-dimensional display effect may include at least one of the following operations.

A shadow can be added to a predetermined graphic element included in the predetermined image to obtain the shadow image including the graphic element having the three-dimensional display effect. Or, a shadow can be added to an outer edge of the predetermined image to obtain the shadow image including a border having the three-dimensional display effect.

Figure 6:
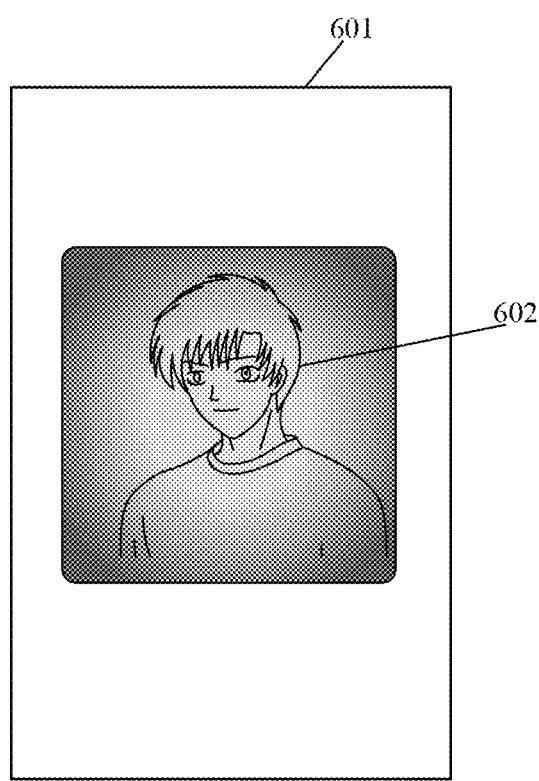
FIG. 6 is a third schematic diagram of a three-dimensional display effect according to exemplary embodiments of the disclosure.

FIG. 6 is a third schematic diagram of a three-dimensional display effect according to some embodiments of the disclosure. As shown in FIG. 6, a predetermined image 602 with a two-dimensional display effect is displayed on an application interface 601. A shadow may be added to a predetermined graphic element included in the predetermined image 602 to obtain a shadow image including a graphic element having the three-dimensional display effect. The predetermined graphic element refers to an element formed based on points, lines and areas in the predetermined image, such as a face, a building and a vehicle.

Figure 7:
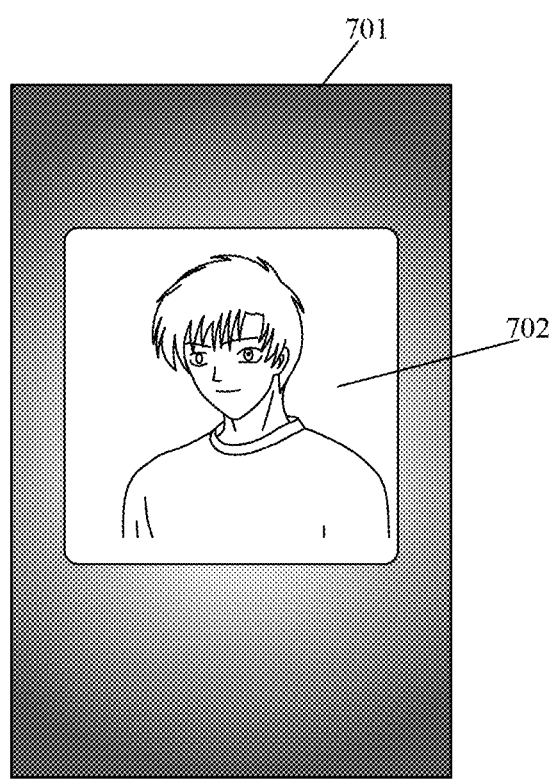
FIG. 7 is a fourth schematic diagram of a three-dimensional display effect according to exemplary embodiments of the disclosure.

FIG. 7 is a fourth schematic diagram of a three-dimensional display effect according to some embodiments of the disclosure. As shown in FIG. 7, a predetermined image 702 with a two-dimensional display effect is displayed on an application interface 701. A shadow may be added to an outer edge of the predetermined image 702 to obtain a shadow image including a border having the three-dimensional display effect.

In an alternative embodiment, shadows may also be simultaneously added to the predetermined image and the outer edge of the predetermined image to obtain the shadow image including the graphic element having the three-dimensional display effect and the shadow image including the border having the three-dimensional display effect. In the embodiments of the disclosure, by adding the shadow to the predetermined graphic element of the predetermined image and/or the outer edge of the predetermined image, the shadow image including the graphic element having the three-dimensional display effect and/or including the border having the three-dimensional display effect may obtained, and then the predetermined image having the two-dimensional display effect is transformed into an image having the three-dimensional display effect. Compared with a certain image displayed in a static manner all the time, the image formed in the embodiments of the disclosure exhibits a stronger stereoscopic effect.

In an alternative embodiment, a first preset region and a second preset region may be the same or different. When the first preset region and the second preset region are the same, the perspective image or the shadow image may be output in this region. When the first preset region and the second preset region are different, the perspective image may be output based on the first preset region, while the shadow image may be output based on the second preset region at the same time. Or, the perspective image is output based on the first preset region, while no shadow image is output. Or, the shadow image is output based on the second preset region, while no perspective image is output. By setting the first preset region and the second preset region, a region needing to be transformed into the three-dimensional display effect according to a requirement, and is displayed based on the three-dimensional display effect, so that the flexibility of effect switching can be improved.

In an alternative embodiment, multimedia information includes audio information, and the predetermined image may include an image associated with the audio information.

Figure 8:
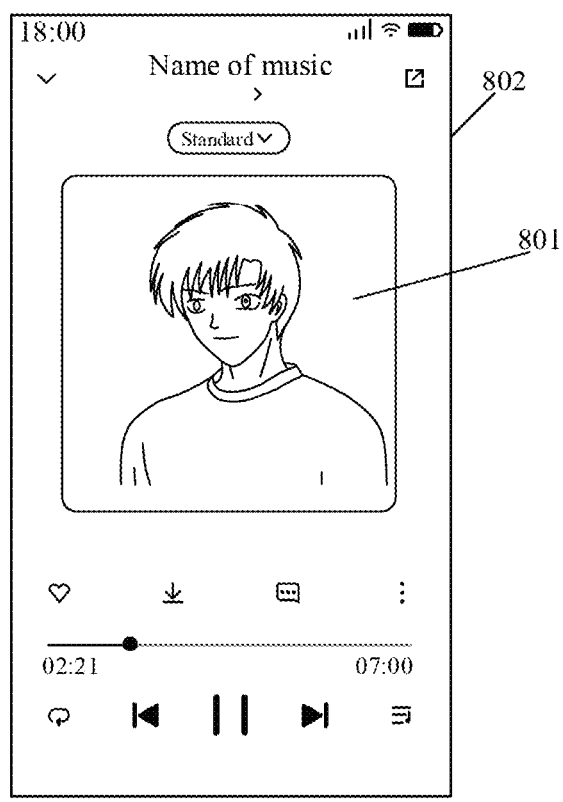
FIG. 8 is a schematic diagram of a music playing interface according to some embodiments of the disclosure.
Figure 9:
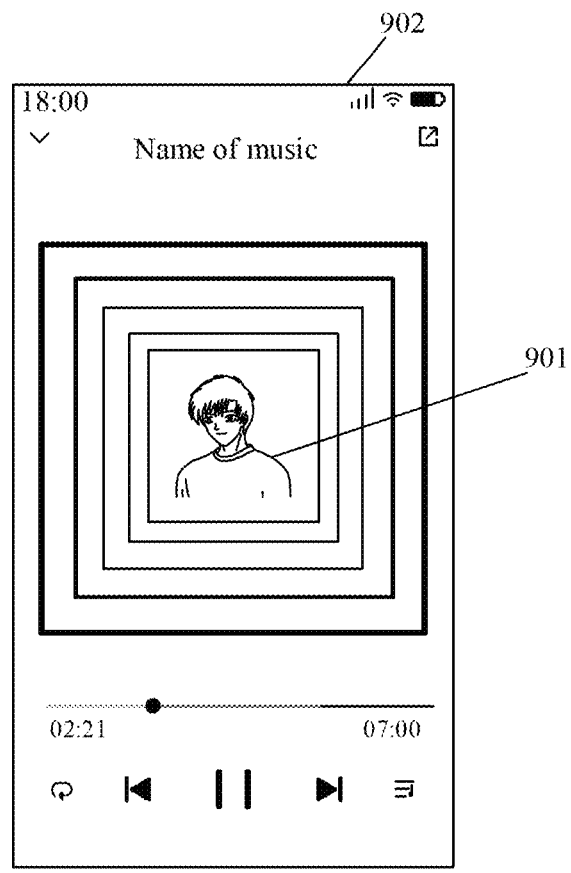
FIG. 9 is a schematic diagram of a three-dimensional effect of a music playing interface according to exemplary embodiments of the disclosure.

By taking a music player serving as the application as an example, the multimedia information may be music information, and the predetermined image may be an image displayed on a certain interface when the music is played. FIG. 8 is a schematic diagram of a music playing interface according to some embodiments of the disclosure. As shown in FIG. 8, an image 801 is displayed on an interface 802 in a two-dimensional display effect, and control, a music name, and the like related to music playing are also disposed on the interface 802. FIG. 9 is a schematic diagram of a three-dimensional effect of a music playing interface according to some embodiments of the disclosure. As shown in FIG. 9, the size of an image 901 is reduced according to a set direction, and multiple outward-expanding line frames are set around the image 901. In this way, the image 901 may be displayed on an interface 902 in the three-dimensional display effect. Control related to music playing is also disposed on the interface 902.

Figure 10:
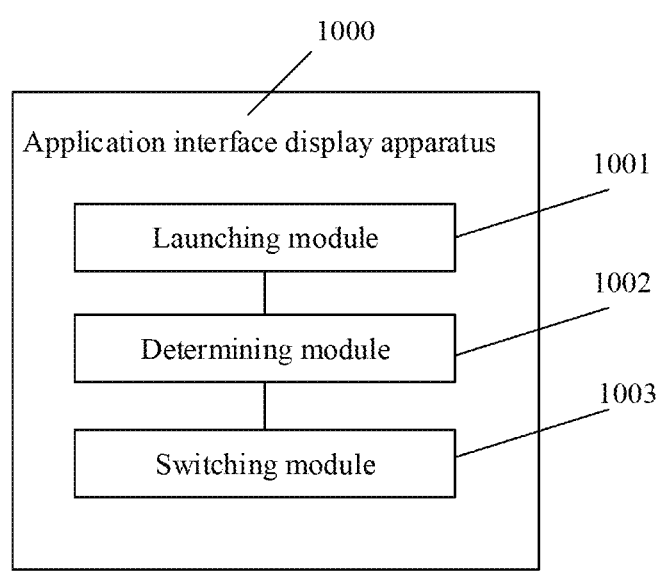
FIG. 10 is a block diagram of an application interface display apparatus according to exemplary embodiments of the disclosure.

FIG. 10 is a block diagram of an application interface display apparatus according to some embodiments of the disclosure. As shown in FIG. 10, the application interface display apparatus 1000 mainly includes a launching module 1001, a determining module 1002, and a switching module 1003.

The launching module 1001 is configured to launch an application to enter an application interface.

The determining module 1002 is configured to determine to output multimedia information on the application interface.

The switching module 1003 is configured to switch a display effect of a preset region of the application interface from a two-dimensional display effect to a three-dimensional display effect when the multimedia information is output.

In an alternative embodiment, the switching module 1003 can include a first transformation sub-module that is configured to perform perspective transformation on a predetermined image having the two-dimensional display effect to obtain a perspective image having the three-dimensional display effect, and a first output sub-module that is configured to output the perspective image in a first preset region of the application interface.

In an another embodiment, the first transformation sub-module is further configured to set at least two outward-expanding line frames with different sizes around the predetermined image to obtain the perspective image having the three-dimensional display effect, or set at least two inward-shrinking line frames with different sizes within the predetermined image to obtain the perspective image having the three-dimensional display effect.

In an embodiment, the switching module 1003 can include a second transformation sub-module that is configured to perform projection transformation on a predetermined image having the two-dimensional display effect to obtain a shadow image having the three-dimensional display effect, and a second output sub-module that is configured to output the shadow image in a second preset region of the application interface.

In an alternative embodiment, the second transformation sub-module can be further configured to add a shadow to a predetermined graphic element included in the predetermined image to obtain the shadow image including the graphic element having the three-dimensional display effect, and/or add a shadow to an outer edge of the predetermined image to obtain the shadow image including a border having the three-dimensional display effect.

In an alternative embodiment, multimedia information includes audio information, and the predetermined image may include an image associated with the audio information.

Figure 11:
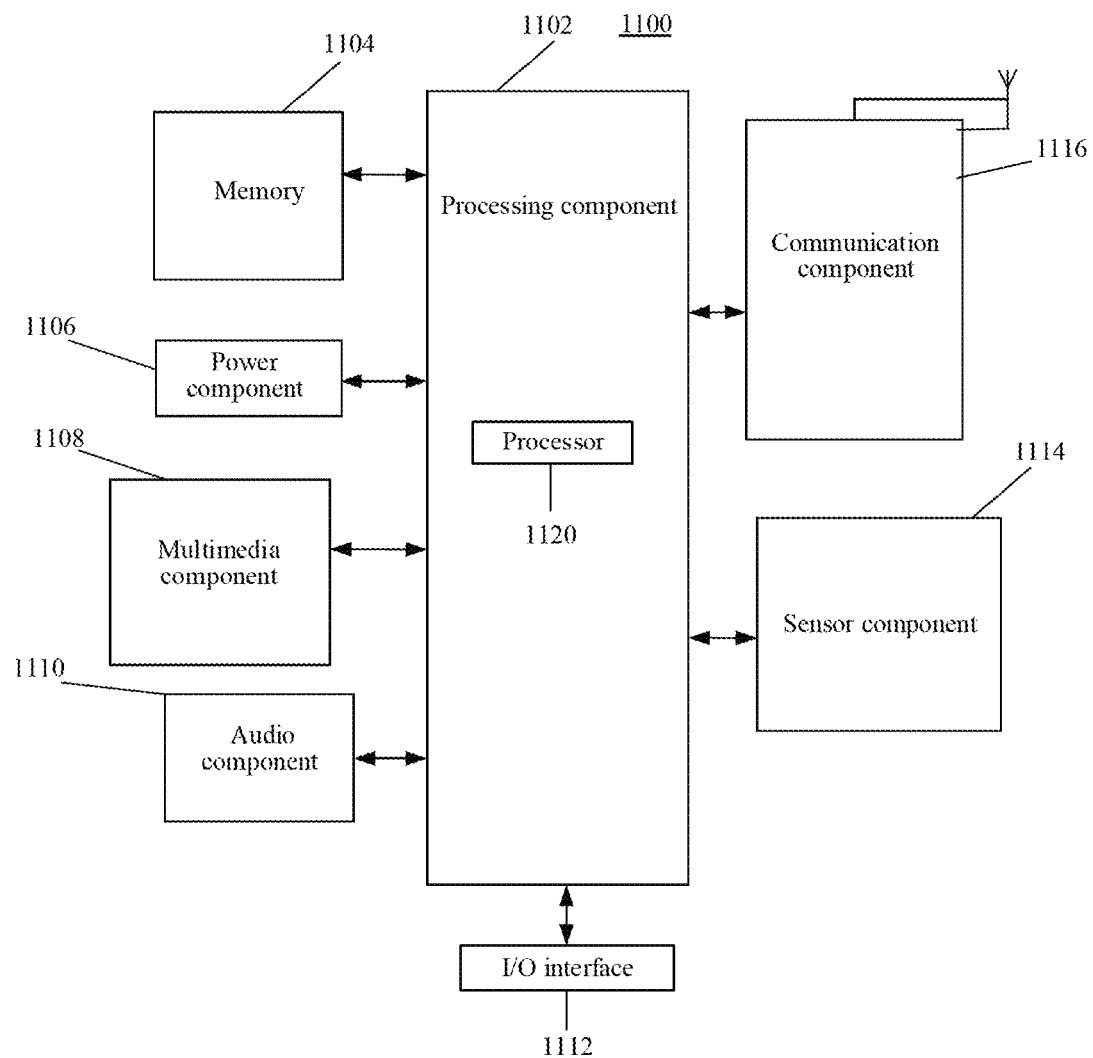
FIG. 11 is a block diagram of a hardware structure of an application interface display apparatus according to exemplary embodiments of the disclosure.

FIG. 11 is a block diagram of a hardware structure of an application interface display apparatus 1100 according to some embodiments of the disclosure. For example, the device 1100 may be a mobile phone, a computer, a digital broadcasting terminal, a message transceiver device, a game console, a tablet device, a medical device, a fitness device, a personal digital assistant, and the like.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 generally controls overall operations of the device 1100, such as operations related to displaying, telephone calls, data communications, camera operations, and recording operations. The processing component 1102 may include one or more processors 1120 to execute instructions to complete all or part of the operations of the method described above. In addition, the processing component 1102 may include one or more modules to facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operations at the device 1100. Examples of such data include instructions for any application or method operated on the device 1100, contact data, phone book data, messages, pictures, videos, and the like. The memory 1104 may be implemented by any type of volatile or non-volatile storage devices or a combination thereof, such as Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1106 provides power to the various components of the device 1100. The power component 1106 may include a power management system, one or more power supplies, and other components associated with generation, management, and distribution of power for the device 1100.

The multimedia component 1108 includes a screen that provides an output interface between the device 1100 and a user. In some embodiments, the screen may include a Liquid Crystal Display (LCD) and a Touch Panel (TP). If it includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 1108 includes a front camera and/or a rear camera. When the device 1100 is in an operation mode, such as a photographing mode or a video mode, the front camera and/or the rear camera may receive external multimedia data. Each front camera and each rear camera may be fixed optical lens systems or may have focal lengths and optical zoom capabilities.

The audio component 1110 is configured to output and/or input audio signals. For example, the audio component 1110 includes a microphone (MIC), and the microphone is configured to receive an external audio signal when the device 1100 is in an operation mode, such as a calling mode, a recording mode, and a voice identification mode. The received audio signal may be further stored in the memory 1104 or transmitted via the communication component 1116. In some embodiments, the audio component 1110 further includes a speaker configured to output audio signals.

The I/O interface 1112 provides an interface between the processing component 1102 and a peripheral interface module. The peripheral interface module may be a keyboard, a click wheel, a button, and the like. These buttons may include, but not limited to: a home button, a volume button, a start button, and a lock button.

The sensor component 1114 includes one or more sensors configured to provide various aspects of state assessment for the device 1100. For example, the sensor component 1114 may detect an on/off state of the device 1100 and a relative position of components. For example, the components are a display and a small keypad of the device 1100. The sensor component 1114 may further detect a position change of the device 1100 or one component of the device 1100, the presence or absence of user contact with the device 1100, orientation or acceleration/deceleration of the device 1100, and temperature variations of the device 1100. The sensor component 1114 may include a proximity sensor configured to detect the presence of objects nearby without any physical contact. The sensor component 1114 may also include a light sensor, such as a Complementary Metal Oxide Semiconductor (CMOS) or Charge Coupled Device (CCD) image sensor, for use in imaging applications. In some embodiments, the sensor component 1114 may further include an acceleration sensor, a gyroscope sensor, a magnetic sensor, a pressure sensor, or a temperature sensor.

The communication component 1116 is configured to facilitate wired or wireless communications between the device 1100 and other devices. The device 1100 may access a wireless network based on a communication standard, such as WiFi, 2G or 6G, or a combination thereof. In one exemplary embodiment, the communication component 1116 receives a broadcast signal or broadcast related information from an external broadcast management system via a broadcast channel. In one exemplary embodiment, the communication component 1116 further includes a Near Field Communication (NFC) module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology, and other technologies.

In the exemplary embodiment, the device 1100 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In the exemplary embodiment, a non-transitory computer-readable storage medium having stored thereon instructions, such as a memory 1104 including an instruction, is further provided. The instruction may be executed by a processor 1120 of a device 1100 to complete the foregoing method. For example, the non-transitory computer-readable storage medium may be an ROM, an RAM, a CD-ROM, a magnetic tape, a floppy disk, an optical data storage device, and the like.

According to the non-transitory computer-readable storage medium having stored thereon instructions that, when executed by a processor of an application interface display apparatus, may cause the application interface display apparatus to implement an application interface display method. The method can include the following operations.

An application is launched to enter an application interface. It is determined to output multimedia information on the application interface. When the multimedia information is output, a display effect of a preset region of the application interface is switched from a two-dimensional display effect to a three-dimensional display effect.

Those skilled in the art will easily think of other implementation solutions of the disclosure after considering the specification and practicing the invention disclosed here. The disclosure is intended to cover any variations, uses, or adaptive changes of the disclosure. These variations, uses, or adaptive changes follow the general principles of the disclosure and include common general knowledge or conventional technical means in the technical field, which are not disclosed herein. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. An application interface display method, comprising:
launching an application to enter an application interface;
determining to output multimedia information on the application interface; and
switching a display effect of a preset region of the application interface from a two-dimensional display effect to a three-dimensional display effect when the multimedia information is output, wherein the preset region comprises a first preset region and a second preset region,
wherein switching the display effect of the preset region of the application interface from the two-dimensional display effect to the three-dimensional display effect further comprises:
outputting the perspective image with three-dimensional display effect in the first preset region of the application interface; and
outputting the shadow image with three-dimensional display effect in the second preset region of the application interface.

2. The method of claim 1, wherein switching the display effect of the preset region of the application interface from the two-dimensional display effect to the three-dimensional display effect further comprises:
performing perspective transformation on a predetermined image having the two-dimensional display effect to obtain a perspective image having the three-dimensional display effect.

3. The method of claim 2, wherein performing perspective transformation on the predetermined image having the two-dimensional display effect to obtain the perspective image having the three-dimensional display effect further comprises:
setting at least two outward-expanding line frames with different sizes around the predetermined image to obtain the perspective image having the three-dimensional display effect; or
setting at least two inward-shrinking line frames with different sizes within the predetermined image to obtain the perspective image having the three-dimensional display effect.

4. The method of claim 1, wherein switching the display effect of the preset region of the application interface from the two-dimensional display effect to the three-dimensional display effect further comprises:

performing projection transformation on the predetermined image having the two-dimensional display effect to obtain a shadow image having the three-dimensional display effect.

5. The method of claim 4, wherein performing the projection transformation on the predetermined image having the two-dimensional display effect to obtain the shadow image having the three-dimensional display effect further comprises at least one of:
adding a shadow to a predetermined graphic element included in the predetermined image to obtain the shadow image including the graphic element having the three-dimensional display effect; or
adding a shadow to an outer edge of the predetermined image to obtain the shadow image including a border having the three-dimensional display effect.

6. The method of claim 2, wherein:
the multimedia information includes audio information, and
the predetermined image includes an image associated with the audio information.

7. An application interface display apparatus, comprising:
a processor; and
a memory that is configured to store instructions executable by the processor,
wherein the processor is configured to:
launch an application to enter an application interface,
determine to output multimedia information on the application interface, and
switch a display effect of a preset region of the application interface from a two-dimensional display effect to a three-dimensional display effect when the multimedia information is output, wherein the preset region comprises a first preset region and a second preset region,
wherein in order to switch the display effect of the preset region of the application interface from the two-dimensional display effect to the three-dimensional display effect, the processor is further configured to:
output the perspective image with three-dimensional display effect in the first preset region of the application interface; and
output the shadow image with three-dimensional display effect in the second preset region of the application interface.

8. The apparatus of claim 7, wherein in order to switch the display effect of the preset region of the application interface from the two-dimensional display effect to the three-dimensional display effect, the processor is further configured to:
perform perspective transformation on a predetermined image having the two-dimensional display effect to obtain a perspective image having the three-dimensional display effect.

9. The apparatus of claim 8, wherein in order to perform perspective transformation on the predetermined image having the two-dimensional display effect to obtain the perspective image having the three-dimensional display effect, the processor is further configured to:
set at least two outward-expanding line frames with different sizes around the predetermined image to obtain the perspective image having the three-dimensional display effect; or
set at least two inward-shrinking line frames with different sizes within the predetermined image to obtain the perspective image having the three-dimensional display effect.

10. The apparatus of claim 7, wherein in order to switch the display effect of the preset region of the application interface from the two-dimensional display effect to the three-dimensional display effect, the processor is further configured to:
perform projection transformation on the predetermined image having the two-dimensional display effect to obtain a shadow image having the three-dimensional display effect.

11. The apparatus of claim 10, wherein in order to perform the projection transformation on the predetermined image having the two-dimensional display effect to obtain the shadow image having the three-dimensional display effect, the processor is further configured to perform at least one of:
adding a shadow to a predetermined graphic element included in the predetermined image to obtain the shadow image including the graphic element having the three-dimensional display effect; or
adding a shadow to an outer edge of the predetermined image to obtain the shadow image including a border having the three-dimensional display effect.

12. The apparatus of claim 8, wherein:
the multimedia information includes audio information, and
the predetermined image includes an image associated with the audio information.

13. A non-transitory computer-readable storage medium having stored thereon instructions that, when executed by a processor of an application interface display apparatus, cause the processor to execute the operations of the application interface display method, the method comprising:
launching an application to enter an application interface;
determining to output multimedia information on the application interface; and
switching a display effect of a preset region of the application interface from a two-dimensional display effect to a three-dimensional display effect when the multimedia information is output, wherein the preset region comprises a first preset region and a second preset region,
wherein switching the display effect of the preset region of the application interface from the two-dimensional display effect to the three-dimensional display effect further comprises:
outputting the perspective image with three-dimensional display effect in the first preset region of the application interface; and
outputting the shadow image with three-dimensional display effect in the second preset region of the application interface.

14. The non-transitory computer-readable storage medium of claim 13, wherein switching the display effect of the preset region of the application interface from the two-dimensional display effect to the three-dimensional display effect further comprises:
performing perspective transformation on a predetermined image having the two-dimensional display effect to obtain a perspective image having the three-dimensional display effect.

15. The non-transitory computer-readable storage medium of claim 14, wherein performing perspective transformation on the predetermined image having the two-dimensional display effect to obtain the perspective image having the three-dimensional display effect further comprises:
setting at least two outward-expanding line frames with different sizes around the predetermined image to obtain the perspective image having the three-dimensional display effect; or setting at least two inward-shrinking line frames with different sizes within the predetermined image to obtain the perspective image having the three-dimensional display effect.

16. The non-transitory computer-readable storage medium of claim 13, wherein switching the display effect of the preset region of the application interface from the two-dimensional display effect to the three-dimensional display effect further comprises:

performing projection transformation on the predetermined image having the two-dimensional display effect to obtain a shadow image having the three-dimensional display effect.

17. The non-transitory computer-readable storage medium of claim 16, wherein performing the projection transformation on the predetermined image having the two-dimensional display effect to obtain the shadow image having the three-dimensional display effect comprises at least one of:

adding a shadow to a predetermined graphic element included in the predetermined image to obtain the shadow image including the graphic element having the three-dimensional display effect; or adding a shadow to an outer edge of the predetermined image to obtain the shadow image including a border having the three-dimensional display effect.

18. The non-transitory computer-readable storage medium of claim 14, wherein:

the multimedia information includes audio information, and the predetermined image includes an image associated with the audio information.

* * * * *